Patented Aug. 22, 1933

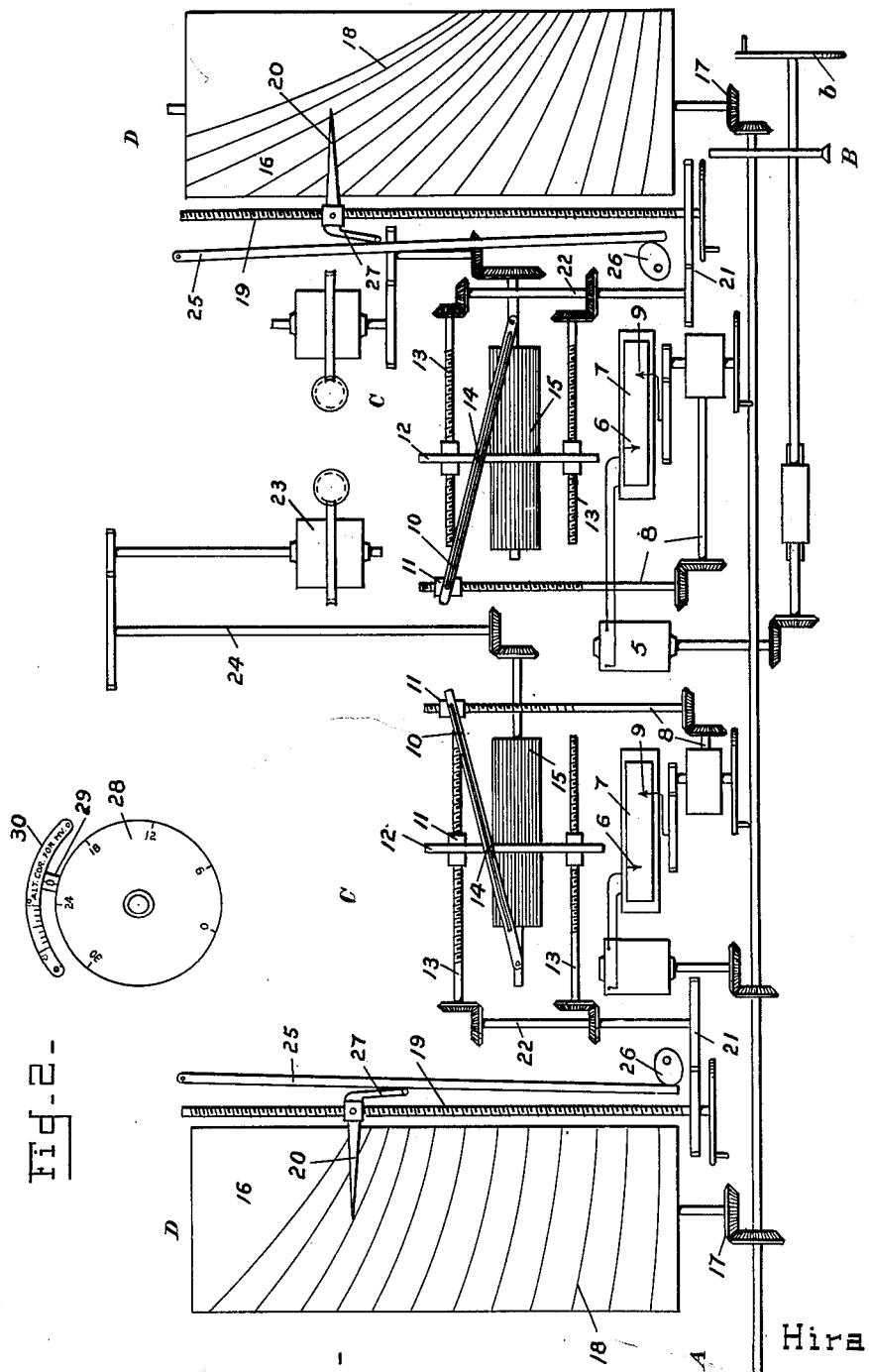

1,923,082

UNITED STATES PATENT OFFICE 1,923,082

FIRE CONTROL APPARATUS

Hiram B. Ely, of the United States Army,
New York, N. Y.

Application March 28, 1929. Serial No. 350,753

2 Claims. (Cl. 235—61.5)

(Granted under the Act of March 3, 1883, as
amended April 30, 1928; 370 O. G. 757)

The invention described herein may be manufactured and used by or for the Government for governmental purposes, without the payment to me of any royalty thereon.

This invention relates to fire control apparatus, particularly designed for securing data applicable to the sights of machine guns and operates according to the angular travel method wherein the vertical and lateral deflections are determined by obtaining a measure of the angular travels of the target vertically and laterally during one unit of time and multiplying these values by the time of flight of projectile.

The invention is characterized by a novel method of incorporating in the time of flight mechanism a provision for consideration of the speed of the target and its angle of approach so that the present time of flight used as a multiplier becomes a fictitious time of flight which corrects for the fact that the observed rate of angular travel is not constant during the time of flight. Provision is also made for entering corrections to muzzle velocity in terms of altitude.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a diagrammatical view of an apparatus embodying the principles of the invention; and Fig. 2 is a view in elevation of the altitude scale.

Referring to Fig. 1, the apparatus is provided with two sighting means A and B which move in elevation and in azimuth, the movements being controlled by two handwheels $a$ and $b$, the handwheel $a$ acting in the accepted manner to elevate both telescopes. The rate of turning to keep the sighting means on the target is a measure of the angular velocity of the target in the vertical and horizontal planes.

One method of establishing an indication of the rate is by actuating the armature of a magneto 5 from the handwheels. The voltage thus generated being proportional to the speed or rotation of the armature, the pointer 6 of a voltmeter 7 affords a measure of the angular rate of movement of the sighting means or the angular velocity of the target in the prescribed plane. This measure is reproduced or converted into rotation of a rate shaft 8 by mechanically moving a pointer 9 to continuously follow or match the pointer 6 of the voltmeter. The rate shaft is connected with the rocker bar 10 of a multiplying mechanism C and has a sliding connection with a nut 11 on the shaft. This mechanism is of conventional design and includes a rack 12 mounted on parallel screw shafts 13 whereby it is movable with respect to the pivot of the bar 10. The rack 12 has a slidable connection 14 with the rocker bar and is moved thereby to actuate a pinion 15.

The displacement of the rack 12 is a measure of the time of flight which is the multiplier. The determination of the time of flight is accomplished through the mechanism D duplicated to supply the data for the vertical and lateral deflection. It consists of a cylinder 16 driven from the elevating handwheel $a$ through gearing 17 and accordingly rotatable proportionally to the present angle of sight to the target. The cylinder carries a chart 18 of curves of constant altitude plotted in function of time of flight and angle of sight. The amount of displacement of a screw shaft 19 necessary to move a pointer 20 to the curve of announced altitude will afford a measure of time of flight to be used as a multiplier when transmitted by means of the gearing 21 and shaft 22 to the parallel shafts 13.

The assumption on which the present apparatus is based is that this multiplier depends only on the position of the target and that the motion of the target as determined by its linear speed and angle of approach affects the deflection only by altering the angular velocities in the horizontal and vertical planes. This is equivalent to assuming that for any given present position of the target the quotient of deflection by the corresponding angular velocity is a constant or, at least, that the variation due to change in linear speed or angle of approach is negligible. Proceeding on this assumption the curves on the chart 18 are computed on the basis of the customary speed of the target to be engaged for example 150 miles per hour, and a future angle of approach of 90 degrees. A correction to allow for a speed other than the assumed speed may be arbitrarily entered in the differential 23 which receives through the shaft 24 the product of the multiplying mechanism C.

An arrangement for correcting for angular approach consists of a cam plate 25 positioned by a cam 26 to engage an arm 27 on the pointer 20 and displace the pointer from its normal position perpendicular to the screw shaft 19. The amount of displacement of the pointer from its normal relation to the screw shaft will depend on the cam and on the position of the pointer on the screw shaft and such position is in turn dependent on the angular height and the altitude. In this manner a measure of a fictitious time of flight is generated which is based on present time of flight corrected for the erroneous assumption that the angular velocity is constant during the time of flight and the dead time, if any.

The proper altitude curve to be used in the operation of moving the pointer 20 across the chart 18 is indicated by a dial 28 driven from an altimeter and readable against an index 29. The index is movable against a scale 30 graduated in values of muzzle velocity and interpreting the corresponding corrections to be applied to altitude.

I claim:

1. In a data computer, means movable proportionately to angular height of an observed object, a drum movable in accordance therewith, a chart of curves of altitude on the drum plotted in function of a time factor and angular height on a basis of a given speed and angle of approach, a movable pointer indicating against the chart and a cam plate adjustable in accordance with the angle of approach of the object and engageable to shift the pointer.

2. In a data computer, means movable proportionately to angular height of an observed object, a drum movable in accordance therewith, a chart of curves of altitude on the drum plotted in function of a time factor and angular height on a basis of a given speed and angle of approach, a movable pointer normally perpenditular to the chart and indicating against the chart and means for inclining the pointer from the normal to the scale in accordance with the angle of approach.

HIRAM B. ELY.